(12) United States Patent
Zhao et al.

(10) Patent No.: US 9,945,589 B2
(45) Date of Patent: Apr. 17, 2018

(54) ROTATORY SERIES-POLE MAGNETIC REFRIGERATING SYSTEM

(71) Applicant: CHUANDONG MAGNETIC ELECTRONIC CO., LTD., Foshan, Guangdong (CN)

(72) Inventors: Tianan Zhao, Guangdong (CN); Tianbao Yan, Guangdong (CN); Kewen Long, Guangdong (CN)

(73) Assignee: CHUANDONG MAGNETIC ELECTRONIC CO., LTD., Foshan, Guangdong (CN)

( * ) Notice: Subject to any disclaimer, the term of this patent is extended or adjusted under 35 U.S.C. 154(b) by 51 days.

(21) Appl. No.: 15/035,746

(22) PCT Filed: Apr. 9, 2015

(86) PCT No.: PCT/CN2015/076121
§ 371 (c)(1),
(2) Date: May 10, 2016

(87) PCT Pub. No.: WO2015/154684
PCT Pub. Date: Oct. 15, 2015

(65) Prior Publication Data
US 2016/0282021 A1    Sep. 29, 2016

(30) Foreign Application Priority Data

Apr. 11, 2014 (CN) .......................... 2014 1 0144503

(51) Int. Cl.
*F25B 21/00* (2006.01)

(52) U.S. Cl.
CPC ...... *F25B 21/00* (2013.01); *F25B 2321/0022* (2013.01); *Y02B 30/66* (2013.01)

(58) Field of Classification Search
CPC .............. F25B 21/00; F25B 2321/0022; F25B 2321/0021; F25B 2321/002;
(Continued)

(56) References Cited

U.S. PATENT DOCUMENTS

| | | | |
|---|---|---|---|
| 6,588,216 B1 * | 7/2003 | Ghoshal ................. | F25B 21/00 62/3.1 |
| 2002/0053209 A1 * | 5/2002 | Zimm ..................... | F25B 21/00 62/3.1 |

(Continued)

FOREIGN PATENT DOCUMENTS

| CN | 101979937 | 2/2011 |
|---|---|---|
| CN | 102305491 | 1/2012 |

(Continued)

*Primary Examiner* — Mohammad M Ali

(57) ABSTRACT

The present invention relates to a rotatory series-pole magnetic refrigerating system, comprising a moving magnetic body and at least one vertically-disposed magnetic series, wherein the magnetic series further comprising a plurality of heat insulated cavities, wherein the heat insulated cavities are interconnected in series successively, wherein the interior of the heat insulated cavities are provided with magnetic working mediums, and wherein the moving magnetic body is capable of magnetizes and demagnetizes the magnetic working mediums in a crossing pattern, wherein the upper and lower magnetic working mediums which are adjacent to any magnetic working medium in demagnetizing state in the same magnetic series must be in a magnetizing state, wherein the system further comprising a heat-flow structure, which assists the internal heat energy in the magnetic series to flow in one direction.

11 Claims, 1 Drawing Sheet

(58) Field of Classification Search
CPC ........ F25B 2321/0023; F25B 2321/001; F25B 21/02; F25B 2321/0212; Y02B 30/66; Y02B 30/52
USPC ........................................................... 62/3.1
See application file for complete search history.

(56) References Cited

U.S. PATENT DOCUMENTS

| | | | | |
|---|---|---|---|---|
| 2004/0093877 | A1* | 5/2004 | Wada .................... | F25B 21/00 62/114 |
| 2010/0175392 | A1* | 7/2010 | Malloy .................. | F25B 21/00 62/3.2 |
| 2011/0048031 | A1* | 3/2011 | Barve .................... | F25B 21/00 62/3.1 |
| 2011/0067415 | A1 | 3/2011 | Mao et al. | |

FOREIGN PATENT DOCUMENTS

| | | |
|---|---|---|
| CN | 103925732 | 7/2014 |
| CN | 203785312 | 8/2014 |
| JP | 2007-147136 | 6/2007 |
| JP | 2008-82663 | 4/2008 |

\* cited by examiner

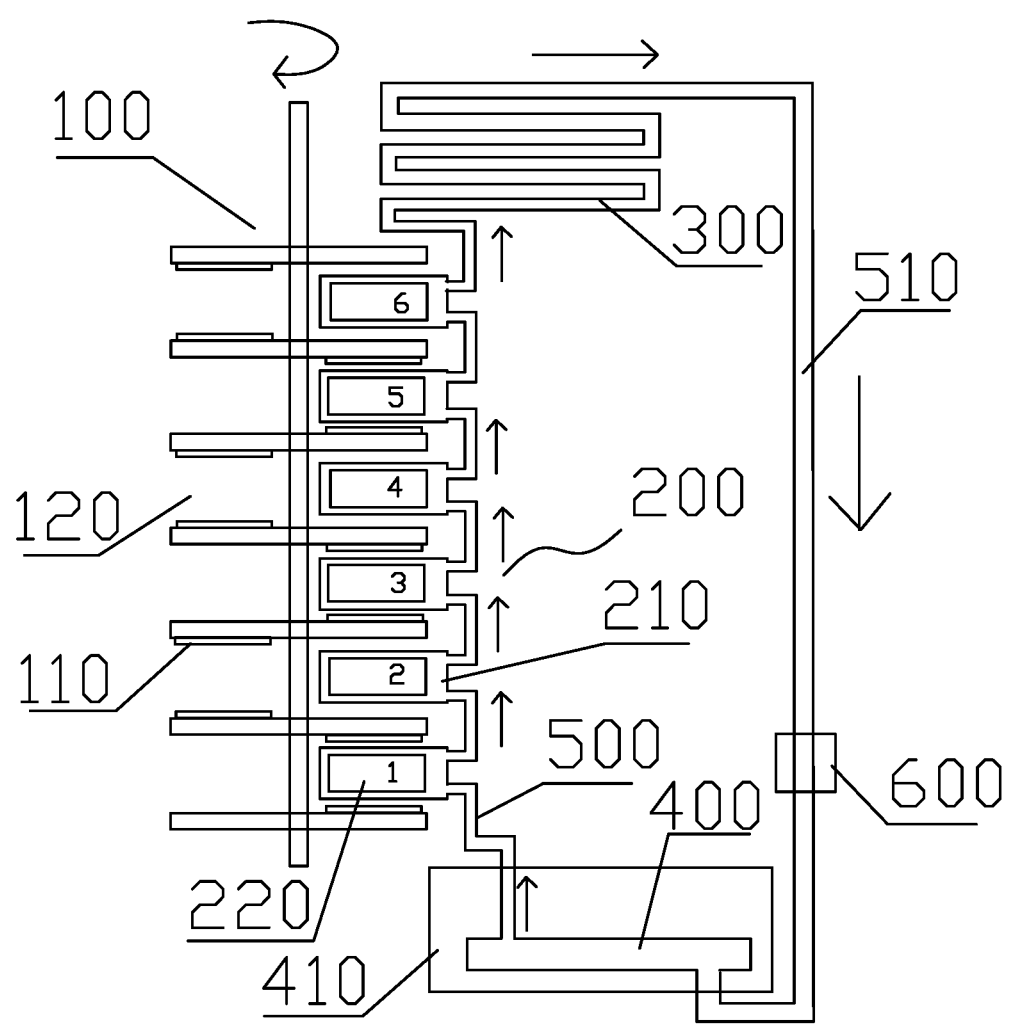

ROTATORY SERIES-POLE MAGNETIC REFRIGERATING SYSTEM

TECHNICAL FIELD OF THE INVENTION

The present invention relates to a magnetic refrigerating device, and more particularly, to a rotatory series-pole magnetic refrigerating system.

BACKGROUND OF THE INVENTION

The magneto-thermal effect is the heat release and heat absorption phenomenon of magnetic materials caused by internal magnetic entropy change during the process of magnetization and demagnetization, which is the inherent characteristic of magnetic materials. Magnetic refrigeration utilizes the magneto-thermal effect of the magnetic materials to achieve refrigeration.

The traditional magnetic refrigerating device is comprised of a fixed magnetic working medium and a moving magnetic body, which magnetizes and demagnetizes the magnetic working medium repeatedly. The core concept of this technology is to utilize the moving magnetic body to magnetize and demagnetize an individual magnetic working medium repeatedly. According to the magneto-thermal effect, the magnetic working medium can release heat in the magnetization process and absorb heat in the demagnetization process. During the process of magnetic heating, the traditional magnetic refrigerating device discharges the heat produced in the process of magnetization of the individual magnetic working medium through the heat dissipation structure as far as possible. This arrangement enables the magnetic working medium to absorb heat from the outside as far as possible during the process of demagnetization cooling of the magnetic working medium so as to create the low-temperature space and achieve the refrigerating effect. The prior art magnetic refrigerating devices are manufactured according to the above core concept. Specifically, Application No. 200710305996.7 disclosed an indoor-temperature magnetic refrigerating system. Additionally, utility Application No. 201320101369.2 disclosed a magnetic refrigerating component and a magnetic refrigerator.

However, these traditional arrangements have significant drawbacks. Particularly, due to the small temperature difference (generally 1-3° C.) produced in the magnetization and demagnetization process of the individual magnetic working medium and the low speed and efficiency of the heat conduction under small temperature differential, the heat capacity of the heat conducting material can reduce refrigeration efficiency. The system fails to thoroughly discharge the small quantity of heat produced in the magnetization process of the magnetic working medium in a timely manner. Consequently, the heat negatively effects the refrigeration process. Therefore, there is much room for improvement in the field of refrigeration.

SUMMARY OF THE INVENTION

The purpose of the present invention is to provide a rotatory series-pole magnetic refrigerating system that solves the technical problems of poor refrigeration effects associated with traditional refrigerating devices.

The technical solution of the present invention is the following.

A rotatory series-pole magnetic refrigerating system is comprised of a moving magnetic body and at least one vertically-disposed magnetic series. The magnetic series comprises a plurality of heat insulated cavities, which are successively interconnected in series. The interior of the heat insulated cavities are provided with a magnetic working medium, and the moving magnetic body magnetizes and demagnetizes the magnetic working medium repeatedly in a crossing pattern. The upper and lower magnetic working mediums, which are adjacent to any magnetic working medium in a demagnetizing state in the same magnetic series, must be in magnetizing state.

The system further comprises a heat-flow structure, which assists the internal heat energy in the magnetic series to flow in one direction. The heat-flow structure is interconnected to the two ends of the magnetic series respectively. The heat energy generated in the magnetizing process of the magnetic working medium in the magnetic series flows in one direction under the function of heat transmission and the support of the heat-flow structure. This arrangement enables the magnetic series to form a cold end and a hot end. The cold end is connected to the refrigerating cavity, which is disposed inside of the heat insulated storage container.

The rotatory series-pole magnetic refrigerating system further comprises a magnetic body installation frame for installing the moving magnetic body in a fixed position. The magnetic body installation frame is rotationally disposed in an axial direction. A plurality of magnetic cavities are dislocated and fixed at two sides of the magnetic body installation frame to magnetize and demagnetize the magnetic working medium in the magnetic series. The magnetic cavity comprises two moving magnetic bodies, which are fixed above and below. The cavity for magnetizing and demagnetizing the magnetic working medium in the magnetic series is formed between the two moving magnetic bodies.

Furthermore, a space is provided between every two heat insulated cavities. When the installation frame rotates, the moving magnetic body goes through the space between the heat insulated cavities periodically, and the magnetic cavities periodically magnetize and demagnetize the magnetic working medium in the magnetic series in a crossing pattern. Therefore the cold end and the hot end are formed at both ends of each magnetic series.

In the rotatory series-pole magnetic refrigerating system, the heat-flow structure comprises a pipeline, which is interconnected to the two ends of the magnetic series. Refrigerant is provided inside of the pipeline and the refrigerating cavity to transfer the heat energy. A heat dissipation structure is disposed at the hot end nearby the pipeline.

In the rotatory series-pole magnetic refrigerating system, an auxiliary circulating pump for facilitating the circulation of the refrigerant inside of the pipeline is located at the cold end in close proximity to the pipeline.

In the rotatory series-pole magnetic refrigerating system, a plurality of reflux-stopping structures for preventing the refrigerant from reflowing is located between the heat insulated cavities in the magnetic series.

In the rotatory series-pole magnetic refrigerating system, the heat dissipation structure is connected to the refrigerating cavity through a vertically-disposed upright long pipe.

In the rotatory series-pole magnetic refrigerating system, the outer surface of the magnetic working medium has a wrinkle-like and porous structure.

The present invention offers advantages beyond that of traditional magnetic refrigerating designs. Specifically, traditional magnetic refrigerators focuses on how to enable the magnetic working medium to dissipate more heat in the heating/magnetizing process and absorb more heat in the refrigerating/demagnetizing process. Viewing this problem from a macro-perspective, the present invention attempts to connect dozens of working mediums in a series instead of enlarging the refrigerating effect of a magnetic working medium through the magneto-thermal effect. Therefore, one part of the magnetic working mediums are magnetized for heating and another part of the magnetic working mediums are demagnetized for refrigerating. The two parts cooperate with each other to change the traditional concept of the magnetic refrigerator to be a heat energy elevator (heat energy transfer) and produce a large temperature difference between the two ends of magnetic series and form the cold end and the hot end. The temperature of the cold end can completely meet the requirements of the household refrigerator.

Additionally, the present invention utilizes the magnetic working mediums which possess the magneto-thermal effect through a creative but simple structure, realizing magnetic refrigeration with high practical value and solving the technical problems that have beset traditional magnetic refrigerators. In traditional magnetic refrigerating technology, magnetic heating has a negative effect, which can counteract the effect of magnetic refrigeration. In the present invention, the magnetic heating and magnetic refrigeration both interact to produce refrigerating circulation, thereby significantly improving the overall refrigeration process. In comparison to traditional magnetic refrigerators, the present invention can reduce the consumption of electricity, and eliminate the environmental pollution created by traditional refrigerator compressors. Therefore, the present invention has a long life-span, efficiently maintains excellent refrigeration, and is environmentally safe. Of course, these are all technical solutions with a high practical value.

BRIEF DESCRIPTION OF THE DRAWINGS

FIG. 1 is the structural diagram of the rotatory series-pole magnetic refrigerating system in the present invention.

DESCRIPTION OF THE PREFERRED EMBODIMENTS

Hereinafter, various embodiments for carrying out the present invention will be described in detail with reference to accompanying drawings.

People have studied magnetic refrigerating technology for over half a century, but have not yet perfected the practical application of this technology. This is due to the following technical points: First, the refrigerating effect can become significant only after accumulation because the effect of magnetic refrigeration is weak. Second, the demagnetized refrigeration effect interrelates to the magnetized heating effect, such that the demagnetized refrigeration correlates to the magnetized heating—these two effects generate energy alternatively and counteract each other. Traditional magnetic refrigerators focuses on how to enable the magnetic working medium to dissipate more heat in the heating process and absorb more heat in the refrigerating process. Consequently, traditional magnetic refrigerators have complicated structures, inefficient energy consumption, and poor refrigeration capacity.

Viewing this problem from a macro-perspective, the present invention attempts to connect dozens of working mediums in a series instead of enlarging the refrigerating effect of a magnetic working medium through the magneto-thermal effect. Therefore, one part of the magnetic working mediums are magnetized for heating and another part of the magnetic working mediums are demagnetized for refrigerating. The two parts cooperate with each other to change the traditional concept of the magnetic refrigerator to be a heat energy elevator (heat energy transfer) and produce a large temperature difference between the two ends of magnetic series and form the cold end and the hot end. The temperature of the cold end can completely meet the requirement of household refrigerator.

To understand the technical solution of the present invention, a description of the heat energy elevator principles is in order. The traditional refrigerating theory is to take away the heat energy from an object directly and weaken the electronic vibration (energy level) around the atom in one area. This result in the weakening of the electronic vibration (energy level) of the whole object. However, the present invention causes a non-uniform distribution of heat energy of the object through a heat energy elevating device (heat energy transfer) without taking away the heat energy directly. For instance, the heat energy in the bottom of the object is transferred upwards continuously through the heat energy transfer, enabling the temperature of the lower end to decrease 20° C. and the temperature of the upper end to increase 20° C. Consequently, the cold end and the hot end can be formed. At this moment, the heat energy of the object is not given or taken away (the total heat energy of the object is unchanged) but the cold end can completely meet the refrigerating requirement. The detailed embodiment is hereinafter combined to expound the present invention.

Based on the above theory, the present invention discloses a rotatory series-pole magnetic refrigerating system. As shown in FIG. 1, the system comprises the magnetic series 200, which consists of a plurality of interconnected heat insulated cavities 210. Each heat insulated cavity 210 is disposed from top to bottom. The magnetic working medium 220 is disposed inside of each heat insulated cavity. The heat dissipation structure 300 is disposed on top of the magnetic series 200, and the refrigerating cavity 400 is disposed at the bottom of the magnetic series 200. The magnetic series 200 is connected to the heat dissipation structure 300 and the refrigerating cavity 400 respectively through the pipeline 500. Additionally, the heat dissipation structure 300 is interconnected to the refrigerating cavity 400 through the vertically-disposed long pipe 510 so as to form the circulation loop. The interior (pipeline, refrigerating cavity, magnetic series and upright long pipe) of the circulation loop is filled with the refrigerant. The refrigerant circulates in the circulation loop so as to accelerate the circulation of the heat energy. In a practical application, the refrigerating cavity can be placed into the heat insulated storage container 410 in order to prevent the external heat energy from entering the refrigerating cavity.

As shown in FIG. 1, the magnetic body installation frame 100 for installing the moving magnetic body 100 is disposed at one side of the magnetic series 200. The magnetic body installation frame 100 is rotationally disposed in an axial direction (the ARROW shown in the drawing is the rotatory direction). The two moving magnetic bodies 110 are grouped together and respectively disposed above and below so as to form a plurality of magnetic cavities 120 for magnetizing and demagnetizing the magnetic working medium 220 in the magnetic series 200. The magnetic cavities 120 are disposed at the two sides of the magnetic body installation frame 100 (as shown in FIG. 1) in dislocation pattern. A space is provided between two heat insulated cavities 210. When the installation frame 100 rotates, the moving magnetic body 110 periodically moves through the space between the heat insulated cavities 210, and the magnetic cavities 120 periodically magnetize and demagnetize the magnetic working medium in the magnetic series in a crossing pattern, forming the cold end and the hot end at both ends of each magnetic series.

Additionally, the installation frame 100 rotates in an axial direction and the magnetic cavities 120 periodically magnetize and demagnetize the magnetic working medium 220 inside of the heat insulated cavity 210 in crossing pattern. As shown in FIG. 1, the magnetic working mediums are numbered from the bottom to the top as magnetic working mediums no. 1-6. In its initial state, the magnetic cavity 120 magnetizes the no. 1, 3, and 5 magnetic working mediums. Subsequently, the magnetic working medium starts to release heat, and the temperature of the corresponding heat insulated cavity increases accordingly. Meanwhile, the nos. 2, 4, and 6 magnetic working mediums are demagnetized. Thereafter, the magnetic working medium starts to absorb heat, and the temperature of the corresponding heat insulated cavity decreases accordingly. The temperature of the heat insulated cavity corresponding to the no. 1 magnetic working medium is a little more than that of the heat insulated cavity corresponding to the no. 2 magnetic working medium (this general principle applies to those heat cavities corresponding to the nos. 3, 4, 5, and 6 magnetic working mediums.) With the help of heat transmission (or other assistant structure/method), the heat energy in the heat insulated cavity corresponding to the no. 1 magnetic working medium moves upwards and enters the heat insulated cavity corresponding to the no. 2 magnetic working medium (behaving as the upward movement of the refrigerating steam). Similarly, the heat energy in the heat insulated cavity corresponding to the no. 3 magnetic working medium moves upwards and enters the heat insulated cavity corresponding to the no. 4 magnetic working medium. Additionally, the heat energy in the heat insulated cavity corresponding to the no. 5 magnetic working medium moves upwards and enters the heat insulated cavity corresponding to the no. 6 magnetic working medium. When the magnetic body installation frame rotates for a half cycle, the magnetic cavity magnetizes the nos. 2, 4, 6 magnetic working mediums, and the temperature of the corresponding heat insulated cavities increase accordingly, whereas the nos. 1, 3, 5 magnetic working mediums enter a demagnetized state, and the temperature of the corresponding heat insulated cavities decrease accordingly. The heat energy in the refrigerator enters the heat insulated cavity corresponding to the no. 1 magnetic working medium. Additionally, the heat energy of the heat insulated cavity corresponding to the no. 2 magnetic working medium enters the heat insulated cavity corresponding to the no. 3 magnetic working medium. The heat energy of the heat insulated cavity corresponding to the no. 4 magnetic working medium enters the heat insulated cavity corresponding to the no. 5 magnetic working medium. The heat energy of the heat insulated cavity corresponding to the no. 6 magnetic working medium enters the heat dissipation structure 300. A part of the heat energy is transferred to the outside surroundings through the heat dissipation structure; subsequently, the rest of the heat energy enters the refrigerating cavity through the upright long pipe 510, forming the circulation of heat energy (the flow of heat energy behaving as the transfer and flow of the gas-liquid state of the refrigerant). The effect of transferring heat energy can be realized through this structure. Moreover, the magnetic working mediums are periodically magnetized and demagnetized by the magnetic cavity in a crossing pattern to reach a state of dynamic equilibrium. At this moment, the temperature of the heat insulated cavity nearby the bottom of the magnetic series is comparatively low (the temperature of the heat insulated cavity and the refrigerating cavity corresponding to the no. 1 magnetic working medium is the lowest), and the temperature of the heat insulated cavity nearby the top of the magnetic series is comparatively high, forming the cold end and the hot end. Under ideal conditions, the temperature of the cold end can reach −25° C., and the temperature of the hot end can reach 80° C. Experiment have demonstrated that the temperature of the cold end can reach −5° C. and the temperature of the hot end can reach 55° C. under actual conditions.

To optimize the efficiency of the magnetic refrigeration and enable the magnetic working medium to meet the requirement of the magnetic refrigerating structure, the Curie temperature of each magnetic working medium can differ, and presents a rule of increasing gradually from the bottom to top. The performance of the present device is optimal when the magnetic working mediums operate around the Curie temperature. Meanwhile, the surface of the magnetic working medium is a wrinkle-like and porous structure to accelerate the exchange efficiency of the heat energy of the heat insulated cavity and the corresponding magnetic working medium.

Ideally, according to the concept of the heat energy elevating device, wherein the heat flow and forming the cold end and the hot end so as to keep the external performance of the total heat energy unchanged, the heat dissipation structure is unnecessary. However, in consideration of the difference between the real production and the ideal state, the heat dissipation structure is connected to the top (hot end) of the magnetic series so as to improve the efficiency of heat dissipation of the hot end to the outer surroundings (reducing the total heat energy of the system continuously). The heat flow is not affected by the heat dissipation structure. The heat dissipation structure can comprise a variety of forms, such as the method of increasing the air contact area (adopting the curving channel shown in FIG. 1), or installing a heat dissipation fan, etc. The heat dissipation structure is not confined by the present invention.

The present invention's heat transfer structure, as well as the method of the assistant magnetic series mentioned in the above working process is not confined by the present invention. In order to ensure that the magnetic refrigerating system has a consistent and rapid heat transfer in the magnetic series, are flow-stopping structure is disposed at the joint between the two heat insulated cavities (not shown in the drawing). The reflow-stopping structure is used to prevent the refrigerant from reflowing (the refrigeration of the refrigerant moves from the bottom to the top; accordingly, the heat energy transfers from bottom to top). More specifically, the reflow-stopping structure may use a unidirectional valve. An auxiliary circulation pump can be further disposed at the lower end of the upright long pipe so as to improve the circulation efficiency of the refrigerant (heat energy).

The present invention can use a plurality of magnetic series, and the structure of the magnetic body installation frame can be designed according to the requirements of real production as long as the structure and working mode of the magnetic body installation frame can periodically magnetize and demagnetize the magnetic working mediums in the magnetic series repeatedly in a crossing pattern. Preferably, the rotatory magnetic body installation frame structure is used in this arrangement. Likewise, a plurality of magnetic working mediums in the magnetic series can be arranged according to the requirement of real production, and the direction of the magnetic series is not confined, but is preferably positioned upright. The materials of the magnetic working mediums can be various, e.g. ferrite material, tin alloy, or metal gadolinium.

Moreover, in practical applications, the function of the upright long pipe is to assist the system form a circulation structure of heat energy. The internal refrigerant forms and keeps the downward pressure under the action of the gravity.

In practical applications, if the present invention is used in a large-sized industrial refrigerating system and the temperature produced at the hot end is comparatively high, the heat energy of the hot end can be utilized according to the conventional method.

Therefore, the present invention utilizes the magnetic working medium, which possesses the magneto-thermal effect through a creative and simple structure to realize the magnetic refrigeration with high practical value, solving the technical problems of traditional magnetic refrigerators. In the present invention, both of the magnetized heating and demagnetized refrigeration circulate refrigeration. Consequently, the present invention creates a more consistent and efficient refrigeration environment. Compared with the traditional refrigerating technology, the present invention reduces the consumption of electricity and eliminates the environmental hazards associated with traditional refrigerating compressors. Additionally, the present invention has a longer life-span and is more efficient than traditional refrigerators.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

The invention claimed is:

1. A rotatory series-pole magnetic refrigerating system, comprising:
a moving magnetic body and at least one vertically-disposed magnetic series, wherein the magnetic series further comprising a plurality of heat insulated cavities, wherein the heat insulated cavities are interconnected in series successively, wherein the interior of the heat insulated cavities are provided with magnetic working mediums, wherein the upper and lower magnetic working mediums which are adjacent to any magnetic working medium in demagnetizing state in the same magnetic series must be in a magnetizing state, wherein the system further comprising a heat-flow structure, which assists the internal heat energy in the magnetic series to flow in one direction, wherein the heat-flow structure is interconnected to the two ends of the magnetic series respectively, wherein the heat energy generated in the magnetizing process of the magnetic working medium in the magnetic series flows in one direction under the function of heat transmission and the support of the heat-flow structure, enabling the magnetic series to form a cold end and a hot end,
wherein the cold end is connected to the refrigerating cavity, which is disposed inside of the heat insulated storage container.

2. The rotatory series-pole magnetic refrigerating system of claim 1, further comprising:
a magnetic body installation frame for installing the moving magnetic body fixedly, wherein the magnetic body installation frame is rotationally disposed in axial direction, wherein a plurality of magnetic cavities is dislocated and fixed at two sides of the magnetic body installation frame so as to magnetize and demagnetize the magnetic working medium in the magnetic series, wherein the magnetic cavity comprises two moving magnetic bodies, which are fixedly disposed above and below, wherein the cavity for magnetizing and demagnetizing the magnetic working mediums in the magnetic series is formed between two moving magnetic bodies, wherein a space is provided between every two heat insulated cavities, wherein when the installation frame rotates, the moving magnetic body goes through the space between the heat insulated cavities periodically and the magnetic cavities periodically magnetize and demagnetize the magnetic working mediums in the magnetic series in crossing pattern, forming the cold end and the hot end at both ends of each magnetic series.

3. The rotatory series-pole magnetic refrigerating system of claim 1, wherein the heat-flow structure comprises a pipeline, which is interconnected to the two ends of the magnetic series, wherein the inside of the pipeline and the refrigerating cavity are provided with refrigerant for transferring the heat energy, wherein a heat dissipation structure is disposed at the hot end nearby the pipeline.

4. The rotatory series-pole magnetic refrigerating system of claim 3, wherein an auxiliary circulating pump for accelerating the circulation of the refrigerant inside of the pipeline is provided at the cold end in close proximity to the pipeline.

5. The rotatory series-pole magnetic refrigerating system of claim 3, wherein the heat dissipation structure is connected to the refrigerating cavity through a vertically-disposed long pipe.

6. The rotatory series-pole magnetic refrigerating system of claim 1 wherein the outer surface of the magnetic working medium is porous.

7. The rotatory series-pole magnetic refrigerating system of claim 2 wherein the outer surface of the magnetic working medium is porous.

8. The rotatory series-pole magnetic refrigerating system of claim 3 wherein the outer surface of the magnetic working medium is porous.

9. The rotatory series-pole magnetic refrigerating system of claim 4 wherein the outer surface of the magnetic working medium is porous.

10. The rotatory series-pole magnetic refrigerating system of claim 3 wherein the outer surface of the magnetic working medium is porous.

11. The rotatory series-pole magnetic refrigerating system of claim 5 wherein the outer surface of the magnetic working medium is porous.

* * * * *